United States Patent [19]

Nenakhov et al.

[11] Patent Number: 4,678,076
[45] Date of Patent: Jul. 7, 1987

[54] TRANSFER ASSEMBLY OF BELT CONVEYOR

[75] Inventors: Sergei S. Nenakhov; Robert S. Tilles, both of Moscow; Vitaly V. Savinykh, Moskovskoi; Vladimir A. Dyakov; Vladimir V. Nikitin, both of Moscow, all of U.S.S.R.

[73] Assignee: Vsesojuzny Institut Po Proektirovaniju Organizatsii Energeticheskogo Stroitelstva, Moscow, U.S.S.R.

[21] Appl. No.: 787,430

[22] Filed: Oct. 15, 1985

[30] Foreign Application Priority Data

Oct. 24, 1984 [SU] U.S.S.R. .............................. 3806901

[51] Int. Cl.$^4$ ............................................ B65G 47/19
[52] U.S. Cl. ................................... 198/525; 198/956
[58] Field of Search ............... 198/525, 534, 836, 633, 198/640, 860.3, 956; 193/7, 32, 40; 222/55, 415

[56] References Cited

U.S. PATENT DOCUMENTS

| 997,276 | 7/1911 | Curtis | 193/32 |
| 1,092,602 | 4/1914 | Smith et al. | 193/32 |
| 3,828,919 | 8/1974 | Haltsclaw et al. | 198/633 X |
| 3,963,117 | 6/1976 | Nausedas | 198/836 |
| 4,279,338 | 7/1981 | Sekora | 198/525 |

FOREIGN PATENT DOCUMENTS

| 134255 | 11/1969 | Czechoslovakia . | |
| 10024 | 3/1956 | Fed. Rep. of Germany | 193/32 |
| 1060317 | 6/1959 | Fed. Rep. of Germany | 198/525 |
| 2703037 | 7/1978 | Fed. Rep. of Germany | 32/ |

OTHER PUBLICATIONS

"Rotec Creter Crane 125-24," Rotec Industries, Inc. Service Manual, pp. 32-33.

Primary Examiner—Joseph E. Valenza
Assistant Examiner—Jonathan D. Holmes
Attorney, Agent, or Firm—Burgess, Ryan & Wayne

[57] ABSTRACT

A transfer assembly of a belt conveyor comprises a discharge drum of the conveyor rigidly secured on a frame at the discharge end of the conveyor. Also on the discharge end of the conveyor is hinged a deflector shield which has a curvilinear portion whose concavity faces the discharge drum and is located after the drum along the conveyor belt movement. The shield has an entry portion located before the discharge drum along the conveyor belt movement. A support is secured rigidly to the frame at the discharge end of the conveyor. Two rods are hinged by first ends to the support, the rods being positioned one after the other along the conveyor belt. The other ends of the rods are hinged to the shield so that the distance between the first ends does not exceed the distance between the other ends of the rods.

4 Claims, 2 Drawing Figures

U.S. Patent        Jul. 7, 1987        4,678,076
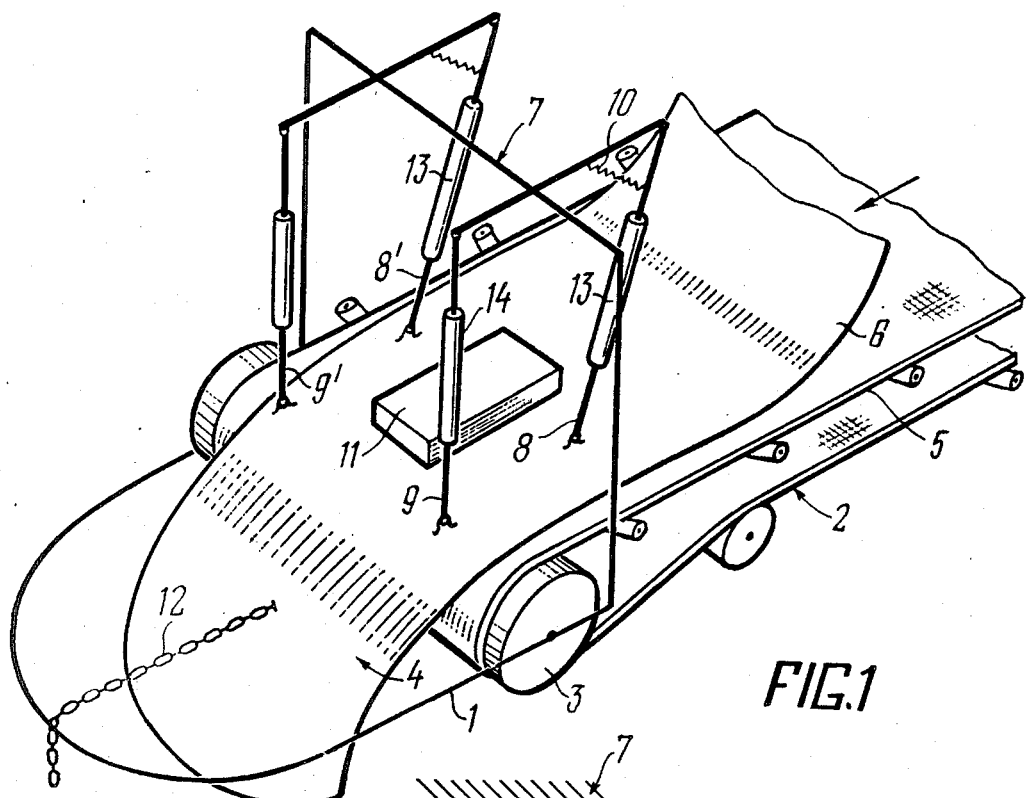
FIG.1
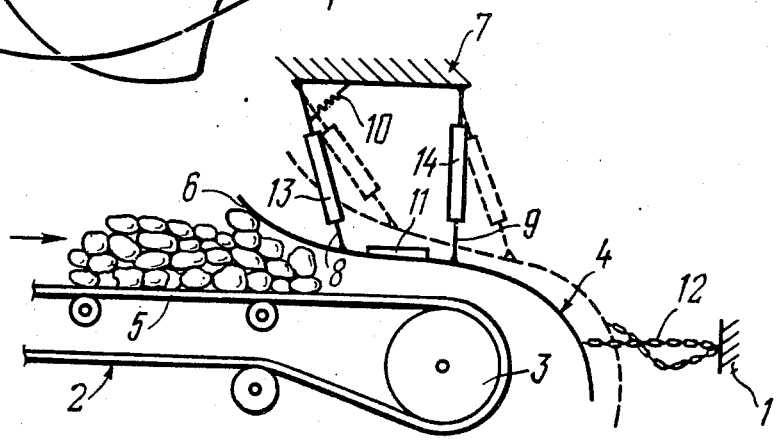
FIG.2
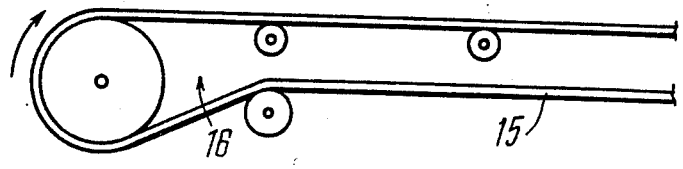

TRANSFER ASSEMBLY OF BELT CONVEYOR

FIELD OF THE INVENTION

This invention relates to conveyor machines and, in particular, to transfer assemblies of belt conveyors used for transportation of crushed rock, building materials and other bulk materials in building and mining industries. Transfer assemblies are installed at the end of belt conveyors where the transported material is transferred from one conveyor to another.

PRIOR ART

Known in the art are transfer assemblies of belt conveyors, which comprise a frame means (frame), a discharge end of the conveyor, a disharge drum and a deflecting shield means (deflector shield) installed on the frame (cf., for example, Czechoslovakian Pat. No. 134 255, Cl. 81 1 11, filed Aug. 10, 1968). The deflector shield is made concave and the concavity faces the discharge drum. The deflector shield is connected to the frame by means of rods which can be used to adjust the position of the shield to the feed and receiving conveyors.

But this transfer assembly is deficient in that the deflector shield is installed rigidly in relation to the discharge drum of the feeding conveyor and cannot move under the impact of pieces of transported material. Since the deflector shield does not yield to those impacts, the impact load applied to the components of the transfer assembly is substantial. The high impact load combined with the friction of the transported material against the deflector shield results in intensive wear of the shield and deterioration of the quality of the material due to crushing.

Also known in the art is a transfer assembly of a belt conveyor (cf., for example, Service Manual and Illustrated Catalogue of Parts to Crane Model 125-24 of Rotec Industries Inc.) comprising a rigid frame, a discharge end of the conveyor, a discharge drum and a deflector shield whose concavity faces the discharge drum and which is hinged on the frame. The hinges connecting the frame and shield are located at the top of the shield. The working surface of the deflector shield is disposed at an angle to the direction of the conveyor belt. The lower portion of the deflector shield is provided with limiting means which are chains connected to the shield and frame. This certainly reduces the impact load on the shield and reduces the crushing of the material as compared to the first device described above.

But during transportation of materials having occasionally large pieces the process goes like this: the first impact deflects the shield to an extreme position, and the impact of the next piece is exerted either on the deflecting shield which is essentially deflected to a rigidly stationary position or, even worse, on the shield moving towards the flow of the moving material. This conveyor is, therefore, used mainly for handling materials having no large pieces.

It is an object of the invention to reduce crushing of handled materials transferred from one conveyor to another.

Another object of the invention is to ensure transfer of materials having occasional large pieces and, at the same time, to reduce the impact load exerted on the components of the deflector shield means.

One more object of the invention is to provide a deflector shield means which can be adjusted depending on the physical and mechanical properties and geometrical characteristics of the handled material.

SUMMARY OF THE INVENTION

These objects are achieved by providing a transfer assembly made as follows.

A transfer assembly comprises: a rigid frame means; a discharge end of the conveyor; a discharge drum of the conveyor, which is rigidly secured on said frame means at the discharge end of the conveyor; a deflector shield means (deflector shield) hinged to the frame at the discharge end of the conveyor; said deflector shield has a curve portion whose concavity faces the discharge drum; said deflector shield is located after the discharge drum downstream the conveyor belt and at a certain distance therefrom; said deflector shield has an entry portion located before said discharge drum downstream said conveyor belt; a supporting means (support) rigidly secured to said frame and installed at the discharge end of the conveyor; at least two tie-rods displaced one after another downstream the conveyor belt and hinged by their ends to the deflector shield and by other ends to the frame. This provides a hinged connection of the deflector shield and the frame. The tie-rods are spaced somewhat apart, the distance between the ends secured to the deflector shield being substantially the same as that between the ends secured to the frame.

This transfer assembly is designed so that the deflector shield is pushed, on impact with the transported material, forward and upward, thus reducing the dynamic load on the components of the transfer assembly. In addition, the material transported on the conveyor can slip or roll on the deflector shield without being crushed on impact because the shield is provided with an entry portion located in the direction of the conveyor belt travel or at an insignificant angle thereto and can give way as described above. Since a part of the entry portion of the shield is located before the discharge drum along the conveyor belt, the transported material comes into contact with the shield at a moment when the material is still on the conveyor belt and the impact load on both the deflector shield and the material are substantially reduced.

The entry end of the deflector shield can be made curvilinear and have its concavity face the discharge end of the conveyor. The position of the deflector shield can thus be automatically adjusted depending on the thickness of the material transported by the conveyor belt.

The tie rod which is located first along the conveyor belt travel can be made shorter than the tie rod located after the first one. The deflector shield can thus be turned in the vertical plane. The entry end of the deflector shield moves, on impact, upward and in the direction of the belt travel faster than the opposite end, which contributes to the damping and shock-absorbing capability of the transfer assembly of the conveyor.

One of the tie rods of the transfer assembly can be spring-loaded. The thrust directed from above onto the flow of the material discharged from the conveyor belt can be adjusted by changing the spring forced applied to the rod. In this manner the shield remains constantly in contact with the transported material and deflects this material to a specific point. With the same end in view, the shield can be provided with a counterbalance.

The deflection shield can be also equipped with a return stop made as a flexible member having one end connected to the deflector shield and the other to the frame. The conveyor can thus be directed upwards to a certain angle, the deflector shield being kept in place in relation to the discharge drum.

Rods can be equipped with a device for adjusting their length in order to control the position of the deflector shield with respect to the discharge drum and provide optimal conditions for transfer of materials having different physical, mechanical and geometrical parameters.

BRIEF DESCRIPTION OF THE DRAWINGS

The invention will now be described in greater detail with reference to specific embodiments thereof, taken in conjunction with the accompanying drawings, wherein:

FIG. 1 shows a general view of a transfer assembly of a belt conveyor, according to the invention;

FIG. 2 shows a side view of a transfer assembly, according to the invention.

DETAILED DESCRIPTION OF THE INVENTION

A transfer assembly of a belt conveyor comprises: a rigid frame means which can be made as a frame 1; a discharge end 2 of the conveyor, and a discharge drum 3 (FIG. 1). The discharge drum 3 is connected to the frame 1. A deflector shield means is hinged on the frame 1, said means can be made as a deflector shield 4 which is curvilinear and installed on the frame 1 so that the concavity thereof faces the discharge drum 3. The deflector shield 4 is located after the discharge drum 3 downstream the travel (indicated by an arrow) of a conveyor belt 5, at a certain distance therefrom.

The deflector shield 4 has an entry portion 6 disposed before the discharge drum 3 upstream the conveyor belt 5. Also provided is a supporting means or a support 7 rigidly secured to the frame 1 at the discharge end 2 of the conveyor. At least two rods 8 and 9 have their ends hinged to the support 7, their other ends being hinged to the deflector shield 4. In this manner the frame 1 is hinged, by means of the rods 8 and 9 and the support 7, to the deflector shield 4.

The rods 8 and 9 are spaced somewhat apart so that the distance between the ends connected to the deflector shield 4 is almost the same as that between the ends connected to the support 7. In this manner the stable position of the deflector shield 4 is ensured and it cannot come into contact with the conveyor belt 5. Since the deflector shield 4 is suspended on the frame 1 by means of the support 7 and rods 8 and 9, it gives way to the material by shifting in the direction of the material travel and upwards. The impact load on the components of the transfer assembly and transported material are thus reduced. The deflector shield 4 is not limited in its upward movement, it can be lifted until the contact with the transported material is lost. The deflector shield 4 is provided with the entry portion 6 located coaxially with the conveyor belt 5 or at an insignificant angle thereto, before the discharge drum 3 and upstream of the conveyor belt 5, in order that the material engage the deflector shield 4 at a moment when the material is still on the conveyor belt 5. This type of engagement reduces impact loads exerted on the deflector shield 4 and the transported material which can, without rebounding, slip or roll over the working surface of the shield 4 to be directed to a specific point by the curvilinear shape of the shield 4 and its downward thrust. This downward thrust of the deflector shield 4 depends on the mass of the shield 4 and rods 8 and 9. Since the distance between the ends of the rods 8 and 9 connected to the deflector shield 4 does not exceed the distance between the ends of these rods connected to the support 7, the shield 4 has a parallel travel, that is it can travel so that the angle between the direction of the belt movement and the surface of the deflector shield 4 increases. The deflector shield 4 is allowed this parallel travel in order to ensure that the transported material moves along the working surface of the shield 4 without breaking contact therewith.

The entry portion 6 of the deflector shield 4 can be made curvilinear and have its convexity face the discharge end 2 of the conveyor in order to reduce the impact shock load on the components of the transfer assembly and transported material. The position of the deflected shield 4 can be adjusted in the vertical plane depending on the thickness of the transported material on the conveyor belt 5. This adjustment is due to the interaction of the material on the conveyor belt 5 and the convex surface of the entry portion 6 of the shield 4. As a result of this interaction the deflector shield 4 is pushed in the direction of the travelling conveyor belt 5 and upwards.

The rod 8 which is located downstream of the rod 9 in the direction of travel of the conveyor belt 5 can be made shorter than the rod 9. This is done for the following reasons. As the shield 4 meets the material transported on the conveyor belt 5, it is deflected forward in the direction the belt 5 moves and upwards. But it is also turned in the vertical plane and the entry portion 6 rises faster than other portions of the deflecting shield 4. The damping and shock-absorbing properties of the transfer assembly are improved due to this yielding of the entry portion 6 of the deflection shield 4. The same can be achieved if the distance between the ends of the rods 8 and 9, which are connected to the suppport 7, is longer than the distance between the rod ends attached to the deflector shield 4 (FIG. 2). In this case, the deflector shield 4 occupies the position indicated by a dotted line in FIG. 2 and its movements are the same as when the rods 9 are shorter than rods 8 and disposed parallel therewith.

One of the rods 8 or 9 in this embodiment of a transfer assembly can be spring-loaded by a resilient member 10 which can be, in one embodiment installed between the support 7 and the rod 8 or 9, and in another embodiment between the deflector shield 4 and the rod 8 or 9. This resilient member can be made adjustable in order to produce a desired thrust by the deflector shield 4 on the transported material from above irrespective of the mass of the deflector shield 4 which in this case can be minimal. The thrust thus produced permits, as described above, transfer of materials to a desired place. The same can be achieved by providing a counterbalance 11 on the deflector shield 4, which is installed on the external (non-working) surface of this shield 4.

The deflector shield 4 can be provided with a return stop 12 which can be made as a flexible member, for example, a chain, whose one end is attached to the deflector shield 4 and the other to the frame 1. The conveyor can be tilted to feed the material at an upward angle, the position of the deflector shield 4 in relation to the discharge drum 3 remaining the same. Another function of the return stop 12 is to prevent the deflector shield 4 from coming too close to the discharge drum 3 when the shield 4 swings on the irregular flow of the material transported on the belt.

The rods 8 and 9 can be equipped with devices 13 and 14 for adjustment of their length in order to control the position of the deflector shield 4 in relation to the discharge drum 3, in other words, to lift and lower the deflector shield 4 in relation to the conveyor belt 5, after its inclination angle in relation to the direction of movement of the conveyor belt 5. By adjusting the position of the deflector shield 4 in relation to the discharge drum 3, optimal conditions for the operation of the deflector shield 4 can be achieved during transfer of materials having different composition and geometrical characteristics.

The transfer assembly made according to the invention operates as follows.

The material transported on the conveyor belt 5 moves with the belt and arrives at the discharge end 2 of the conveyor. At this stage the material on the belt comes into contact with the entry portion of the deflector shield 4. The thrust of the material slipping over the working surface of the entry portion 6 of the deflector shield 4 pushes the shield 4 forward downstream the conveyor belt 5. Since the deflector shield is hinged to the support 7 on rods 8 and 9, when pushed, it is moved both forward and upward. Further on, the material transported on the belt separates from this belt 5 and goes on moving, by rolling or slipping, along the curvilinear surface of the deflector shield 4 without breaking contact therewith. The material is pressed to the deflector shield 4 by the inertial forces, and the deflector shield 4 produces a required thrust either by its own mass or by the resilient member 10, or by the counter-balance 11. In this manner the flow of material is directed to a belt 15 of a receiving conveyor 16 (FIG. 2). This is due to the concave curvilinear shape of the working surface of the deflector shield 4 which is U-shaped in cross-section and the transported material cannot overflow its outer edges.

When a large piece of material occurs on the belt, the deflector shield 4 is pushed further up and forward, the forward deflection being greater in magnitude and speed than the upward deflection. In this case a large piece of the transported material comes into contact with the surface of the entry portion 6 of the deflector shield 4 at an acute angle, the angle at the point of contact being close to zero. The surface of the deflector shield 4 can be pushed in the direction of the flow of the material on the belt and upwards, thus reducing the impact load on the components of the transfer assembly. In addition, it becomes less probable that pieces of the transported material rebound from the surface of the entry portion 6 of the deflector shield 4 and collide with this surface for the second time. It should also be pointed out that after the passage of a piece of the transported material, the deflector shield 4 returns into the initial position so that the angle of contact of the next piece of the transported material with the surface of the deflector shield 4 remains essentially unchanged. The movement of the deflector shield 4 toward the flow of the transported material is either parallel, when the rods 8 and 9 are equal in length and parallel, or at a decreasing angle between the surface of the shield and the direction of the flow.

The downward travel of the deflector shield 4 is comparatively moderate in magnitude and speed. Besides, the velocity vector of the material in the vertical plane is also directed downwards. The relative velocity and the interaction force between the deflector shield 4 and the flow of material in the vertical plane are insignificant. In this way the collision of the deflector shield 4 with the pieces of the transported material is ruled out and the deflector shield 4 cannot collide with the flow of material moving to meet it. The angle between the surface of the deflector shield 4 and the direction of the moving material at the point of contact is close to 0°.

The rods 8 and 9 are provided with devices 13 and 14 for length adjustment. This can help change the position of the deflector shield 4 in relation to the discharge drum 3 and achieve the angle of interaction of the deflector shield 4 and the flow of the transported material close to 0°. In this way an almost collision-free interaction of the deflector shield 4 and the flow of the transported material can be ensured.

The rods 8 and 9 can have unequal lengths with the same spacing therebetween when attached to the support 7 and deflector shield 4, or alternatively, they can be attached to the support 7 with greater spacing than to the deflector shield 4. This permits greater speed of deflection of the entry portion 6 of the shield 4 when negotiating large pieces of the transported material. The impact load of the material on the components of the deflector shield 4 becomes considerably less.

When one of the rods 8 or 9 is spring-loaded, or when the deflector shield 4 is equipped with a counter-balance 11, it can help adjust the resistance of the shield to the flow of material and thus ensure its effective operation with different materials having different physical and mechanical properties and granulometric composition, various speed of the conveyor belt 5, and different angles of the conveyor.

What is claimed is:

1. A transfer assembly of a conveyor belt extending in a longitudinal direction, comprising:
    a rigid frame means;
    a discharge end of the conveyor;
    a discharge drum of the conveyor, said discharge drum being rigidly secured to said frame means at said discharge end of the conveyor;
    a deflector shield means hinged to said frame means on said discharge end of the conveyor, said deflector shield means having a curvilinear portion whose concavity faces said discharge drum and is located after said discharge drum along the conveyor belt travel;
    said deflector shield means having an entry portion located before said discharge drum upstream along the conveyor belt;
    a support means rigidly secured to said frame means at said discharge end of the conveyor;
    at least two rods spaced from each other in said longitudinal direction and downstream with respect to the conveyor belt, and each hinged at one end to said deflector shield means and at an opposite end to said support means in order to ensure hinged suspension of said shield means from said frame means; and
    said rods being connected to said support means and said deflector shield means so that said entry portion of said deflector shield means rises faster than said curvilinear portion in response to the transporting of large pieces of transported material on said conveyor.

2. A transfer assembly as claimed in claim 1, wherein the entry portion of said shield means is made curvilinear and has its concavity facing said discharge end of the conveyor.

3. A transfer assembly as claimed in claim 1, wherein said rod which is located first along the conveyor belt is shorter than the rod located second along said conveyor belt.

4. A transfer assembly as claimed in claim 1, wherein said rods are provided with a length adjustment device.

* * * * *